US007940726B2

(12) United States Patent
Olsson et al.

(10) Patent No.: US 7,940,726 B2
(45) Date of Patent: May 10, 2011

(54) INTER-ACCESS NETWORK TOPOLOGY DISCOVERY

(75) Inventors: Magnus Olsson, Stockholm (SE); Catherine Mulligan, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 77 days.

(21) Appl. No.: 12/368,504

(22) Filed: Feb. 10, 2009

(65) Prior Publication Data

US 2009/0274069 A1    Nov. 5, 2009

Related U.S. Application Data

(60) Provisional application No. 61/049,214, filed on Apr. 30, 2008.

(51) Int. Cl.
*H04W 4/00* (2009.01)
(52) U.S. Cl. ........................................................ 370/331
(58) Field of Classification Search .................. None
See application file for complete search history.

(56) References Cited

U.S. PATENT DOCUMENTS

| | | | |
|---|---|---|---|
| 2004/0029587 A1* | 2/2004 | Hulkkonen et al. | 455/436 |
| 2004/0121781 A1 | 6/2004 | Sammarco | |
| 2005/0141453 A1* | 6/2005 | Zhu | 370/331 |
| 2009/0170555 A1* | 7/2009 | Olvera-Hernandez et al. | 455/552.1 |
| 2009/0182883 A1* | 7/2009 | Giaretta et al. | 709/228 |
| 2009/0199268 A1* | 8/2009 | Ahmavaara et al. | 726/1 |
| 2009/0207812 A1* | 8/2009 | Gupta et al. | 370/332 |

FOREIGN PATENT DOCUMENTS

| | | |
|---|---|---|
| WO | 2006/063309 | 6/2006 |
| WO | 2007/103975 | 9/2007 |
| WO | 2007/146406 | 12/2007 |

OTHER PUBLICATIONS

International Search Report dated Oct. 30, 2009 (4 pages).
M. Siebert et al. "Hybrid Information System", Vehicular Technology Conference 2004; VTC 2004—Spring; 2004 IEEE 59th Milan, Italy, May 17-19, 2004, Piscataway, NJ; vol. 5, May 17, 2004, pp. 2982-2986, XP010766797.
International Search Report and Written Opinion dated Jun. 30, 2009 (18 pages).

(Continued)

*Primary Examiner* — Chirag G Shah
*Assistant Examiner* — Amarnauth Persaud
(74) *Attorney, Agent, or Firm* — Nixon & Vanderhye P.C.

(57) ABSTRACT

The disclosure relates to building a topology map that can be used to provide a requesting wireless terminal with information relevant to its current location. Information on neighboring cells of different access networks is maintained in the topology map. An inter-access network (IAN) topology apparatus builds to topology map based on results of previous IAN session transfers such as handovers from one access network to a different access network. When the requesting wireless terminal currently accessing a current network makes a request for topology information, the IAN topology apparatus provides a list of cells of other than the current access network in the area of the requesting wireless terminal. The requesting wireless terminal uses the information to scan for cells of other access networks to potentially perform the IAN session transfer. The requesting wireless terminal conserves power by scanning only for accessible cells indicated to be in its area.

27 Claims, 13 Drawing Sheets

OTHER PUBLICATIONS

3GPP TS 23.402 V8.2.0, 3$^{rd}$ Generation Partnership Project; Technical Specification Group Services and System Aspects; Architecture enhancements for non-3GPP accesses (Release 8), Jun. 2008, pp. 35-38.

3GPP TS 23.402 v8.1.1 (Mar. 2008), 3$^{rd}$ Generation Partnership Project; Technical Specification Group Services and System Aspects; Architecture enhancements for non-3GPP accesses (Release 8) (163 pages).

International Preliminary Report on Patentability mailed Sep. 24, 2010 (57 pages).

* cited by examiner

| source cell | | | location | target cell | | | transfer indicator |
|---|---|---|---|---|---|---|---|
| 3GPP | cell 1 | LTE 1 | area A | WiMAX | BS 1 | WM 1 | success |
| WiFi | AP 1 | WLAN 1 | coord B | 3GPP | cell 1 | LTE 1 | failure |
| 3GPP | cell 1 | LTE 1 | coord C | WiFi | AP 1 | WLAN 1 | success likely |
| WiFi | AP 1 | WLAN 1 | null | WiMAX | BS 1 | WM 1 | failure likely |

FIG. 7

INTER-ACCESS NETWORK TOPOLOGY DISCOVERY

RELATED APPLICATION

This application claims the priority and benefit of U.S. provisional patent application 61/049,214 entitled "NETWORK TOPOLOGY DISCOVERY FUNCTION" filed Apr. 30, 2008, which is incorporated herein by reference in its entirety.

TECHNICAL FIELD

The disclosed technology relates to building a topology map of neighboring cells of different access networks so that a wireless terminal can be provided with access network selection information relevant to its location.

BACKGROUND

In the $3^{rd}$ Generation Partnership Project (3GPP) project, an Access Network Discovery Selection Function (ANDSF) is described. The ANDSF server, defined as a part of the System Architecture Evolution (SAE) within the standards bodies (3GPP TS 23.402), provides user equipments (UEs) with policies and access network selection information within a 3GPP access network. The UE can query the ANDSF for information about other non-3GPP access networks. Specifically, the standards documentation states, "It contains data management and control functionality necessary to provision network discovery and selection assistance data as per operators' policy. The ANDSF is able to initiate data transfer to the UE, based on network triggers, and respond to requests from the UE." (3GPP TS 23.402, section 4.8.2.1).

As depicted in FIG. 1, the ANDSF server 110 includes a reference point S14 to provide the UE 120 with access network selection policies and/or discovery hints. The UE 120 can use the information provided on the S14 interface to determine which access network to scan for and also to determine the operator policies with regard to a handover. The UE 120 can decide to stay on the 3GPP access network or to perform a handover to a non-3GPP access network. Thus, the 3GPP standard describes that the ANDSF provides the non-3GPP access network selection information.

However, the standard does not describe how the information is collected and maintained. Rather, it is assumed that topology data are manually provisioned. It is tedious to manually provision and maintain relationships between every cell of a 3GPP access network (GSM, WCDMA, E-UTRAN, LTE, etc.) and surrounding non-3GPP cells. In addition, the manual process is error prone.

SUMMARY

One non-limiting aspect of this disclosure relates to method(s) and apparatus(es) for automatically building a topology map. Another non-limiting aspect relates to method(s) and apparatus(es) for using the topology map so that wireless terminals may efficiently use their resources. In the topology map, mapping information of neighboring cells of different access networks is maintained. Each access network uses a particular access technology such as WiFi, WiMAX, LTE, and so on.

In one non-limiting example embodiment, an inter-access network (IAN) topology apparatus builds the topology map through collecting information of on-going inter-access network (IAN) session transfers. An IAN session transfer occurs when a wireless terminal transitions from accessing a first cell of a first access network to accessing a second cell of a second access network in which the first and second access networks are different. A handover of a wireless terminal from a 3GPP cell to a WiFi access point is an example of an IAN session transfer.

The IAN topology apparatus continually collects the IAN session transfer information and updates the topology map. The topology map built in this manner progressively becomes more comprehensive as time passes. Also, the map will be accurate since the map is based on actual IAN session transfers. Further, changes will automatically be captured.

When a wireless terminal makes a request for topology information, the IAN topology apparatus provides the requesting wireless terminal with information relevant to its location. One of several benefits is that the wireless terminal can save battery power by not performing unnecessary scans, for example, by scanning only for those cells that are accessible in the area or by turning off scanning where there has been no previously reported successful handovers or no accessible cells.

DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale.

FIG. 7 illustrates non-limiting example entries of the topology map;

DETAILED DESCRIPTION

Figure 1:
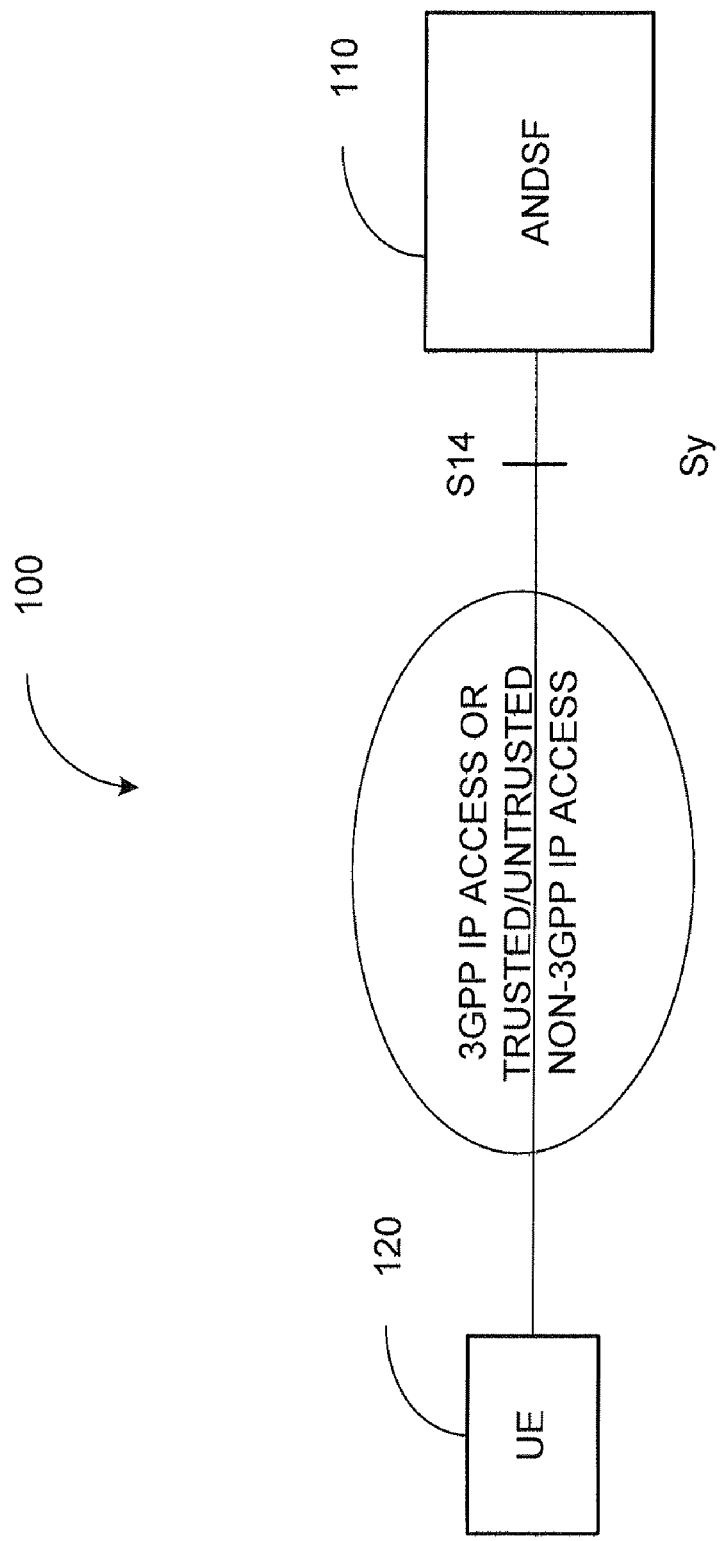
FIG. 1 illustrates a non-limiting example network architectural setup that allows a wireless terminal to communicate with an (IAN) topology apparatus over a defined interface.

In the following description, for purposes of explanation and not limitation, specific details are set forth such as particular architectures, interfaces, techniques, and so on. However, it will be apparent to those skilled in the art that the technology described herein may be practiced in other embodiments that depart from these specific details. That is, those skilled in the art will be able to devise various arrangements which, although not explicitly described or shown herein, embody the principles of the technology.

In some instances, detailed descriptions of well-known devices, circuits, and methods are omitted so as not to obscure the description with unnecessary detail. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

In the description, the terms "cell", "access point", "sector", and so on are used interchangeably. One should keep in mind that a "cell" is not necessarily equivalent to a "base station" (i.e., radio communications equipment). However, the cell and the equipment are related in that the cell refers to a radio coverage area provided by the equipment. Example radio communication equipments include eNodeBs in 3GPP, access points in WiFi (also referred to as WLAN), and base stations in WiMAX. Note that a single equipment can support or serve multiple cells, typically by operating multiple antennas independently such as one antenna per cell or a set of coordinated antennas for each cell. Regardless, it is assumed that the cells are separately identifiable even if they overlap.

In one non-limiting aspect of the disclosure, methods and apparatuses automatically build a topology map of neighboring cells. This addresses the short-comings of the currently assumed manually provisioning of the topology information. As noted, manual provisioning can lead to significant inaccuracies. Without accurate data, a wireless terminal can waste battery resources through continuously scanning for access network cells that may not be there or scanning for cells that the wireless terminal may not be able to access due to operator policies. Manual provisioning is also tedious. It is difficult to manually maintain the relationships between every cells of one access network (e.g., GSM, WCSMA, E-UTRAN, LTE, etc. of 3GPP) and of the surrounding cells of other access networks (non-3GPP such as WiFi, WiMax, CDMA2000, etc.).

By automatically building the topology map of neighboring cells, the wireless terminals can receive accurate information to perform smart scanning for access networks. When the wireless terminal decides to perform an IAN session transfer (e.g., a handover from a 3GPP eNodeB to a WiMAX base station), the wireless terminal can selectively scan for WiMAX base stations nearby its current location.

To provide a context for explaining the methods and apparatuses, a relationship between an access network and the IAN topology apparatus within a make up of an operator network is explained with reference to FIG. 2. An operator network can be viewed as a totality of the system operated by an operator.

As illustrated, the operator network includes one or more access networks enabling communication with the wireless terminals (WT). 3GPP (GSM, LTE, E-UTRAN, etc.), WiFi (aka "WLAN"), and WiMAX are just some non-limiting examples of access networks. Each access network includes one or more cells. In this figure, cells are associated with the radio communication equipments (base stations, access points, eNodeBs, etc.) which provide radio interfaces to the wireless terminals. While not illustrated, each access network includes node elements (gateways, radio network controllers, etc.) that support the cells.

The operator network also includes a core network which is positioned in a logical hierarchy above the access networks. The core network provides functions such as mobility management, session management, user management, roaming, and so on. The core network supports multiple types of access networks and can also include functions specific to a particular access network. In the figure, the IAN topology apparatus (e.g., the ANDSF in 3GPP) is considered to be a part of the core network.

Figure 2:
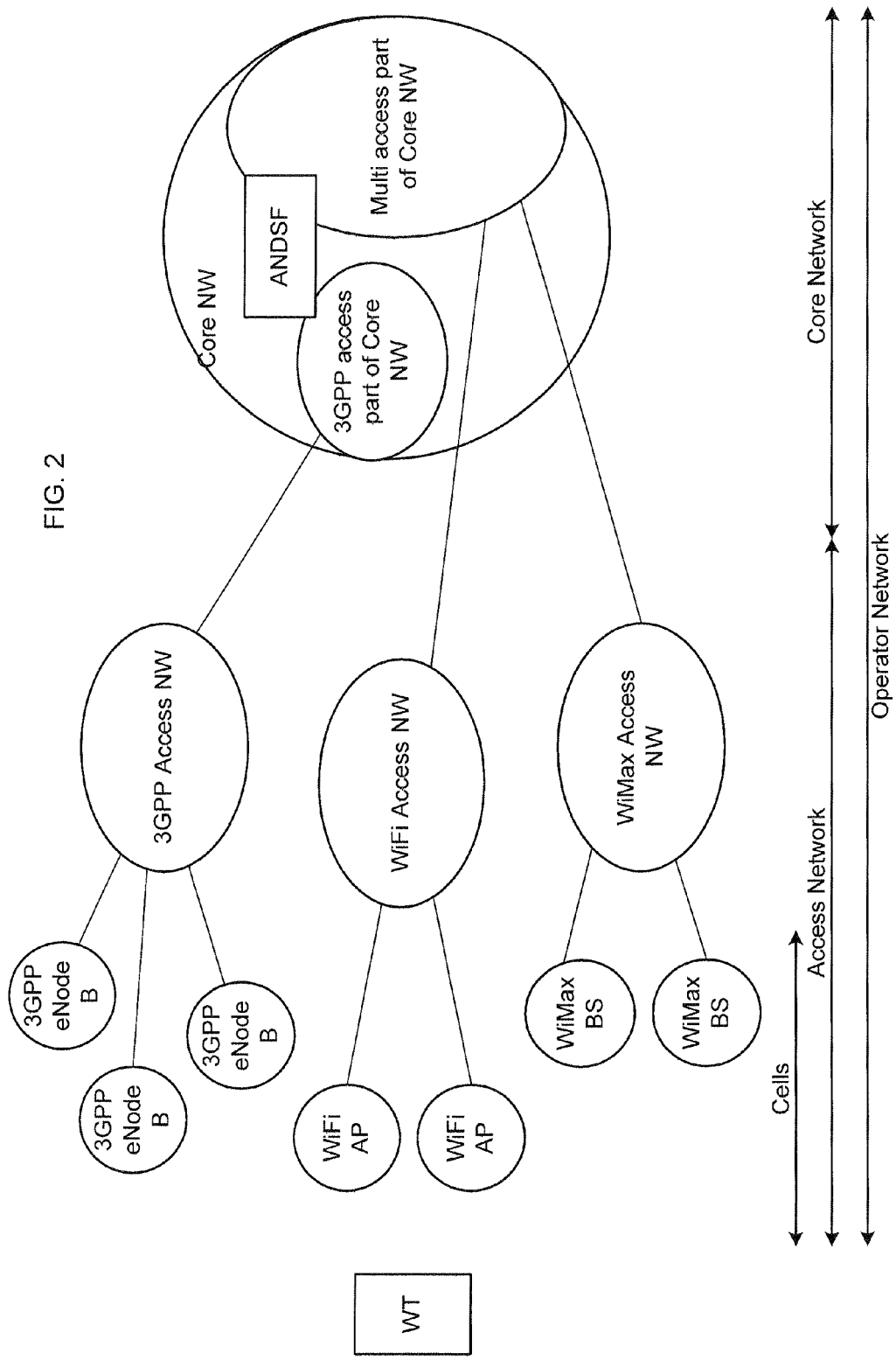
FIG. 2 illustrates a non-limiting example hierarchy of relationships among an operator network, a core network, access networks, and cells.

FIG. 2 demonstrates that an operator may operate multiple access networks. Within one operator network, each access network is typically differentiated by the access technology, e.g., one access network will be 3GPP and another will be WiMAX. However, an operator may choose to implement two or more "access networks" with the same access technology for operational reasons. As long as these access networks and the cells supported by the access networks are individually identifiable, the methods and apparatuses can still apply. Access networks between different operator networks are always considered to be different regardless of their respective access technologies.

Figure 3:
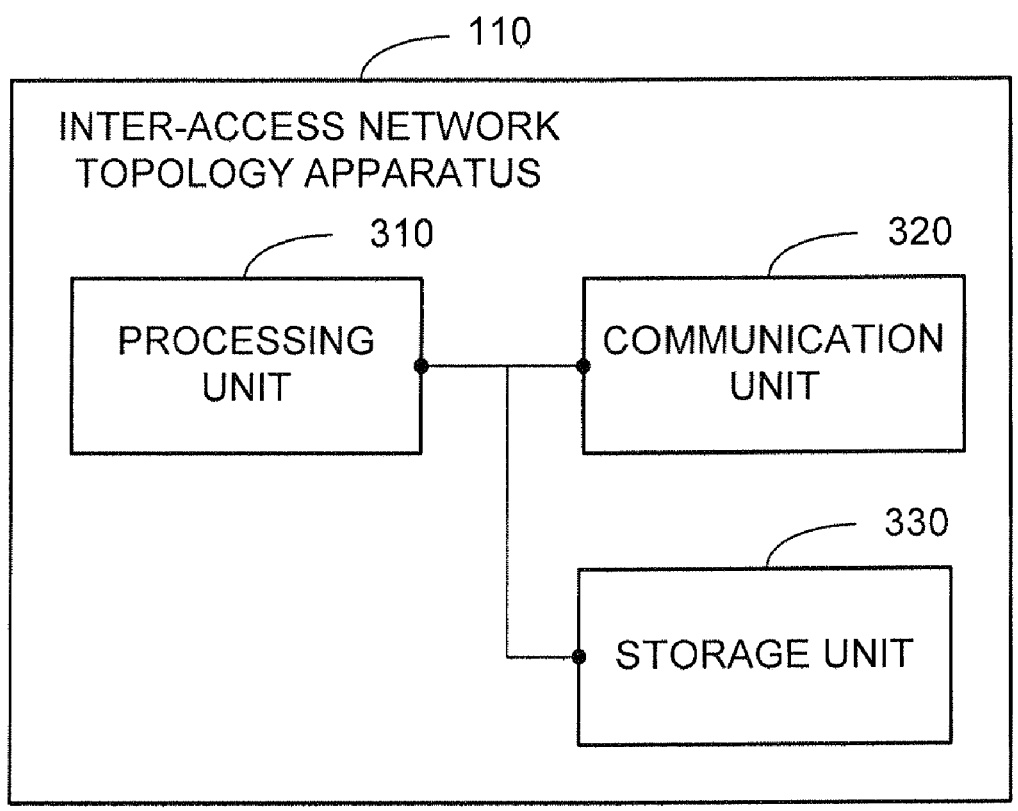
FIG. 3 illustrates a non-limiting example embodiment of an IAN topology apparatus.

FIG. 3 illustrates an example non-limiting embodiment of an inter-access network (IAN) topology apparatus 110. The IAN topology apparatus 110 includes, among others, a processing unit 310, a communication unit 320, and a storage unit 330. The processing unit 310 is arranged to control the other units to provide services associated with the apparatus 110. The communication unit 320 is arranged to communicate with nodes outside of the apparatus 110 and the storage unit 330 is arranged to store information necessary for the apparatus 110 to function. The IAN topology apparatus 110 can be a part of a core network of an operator network.

Figure 4:
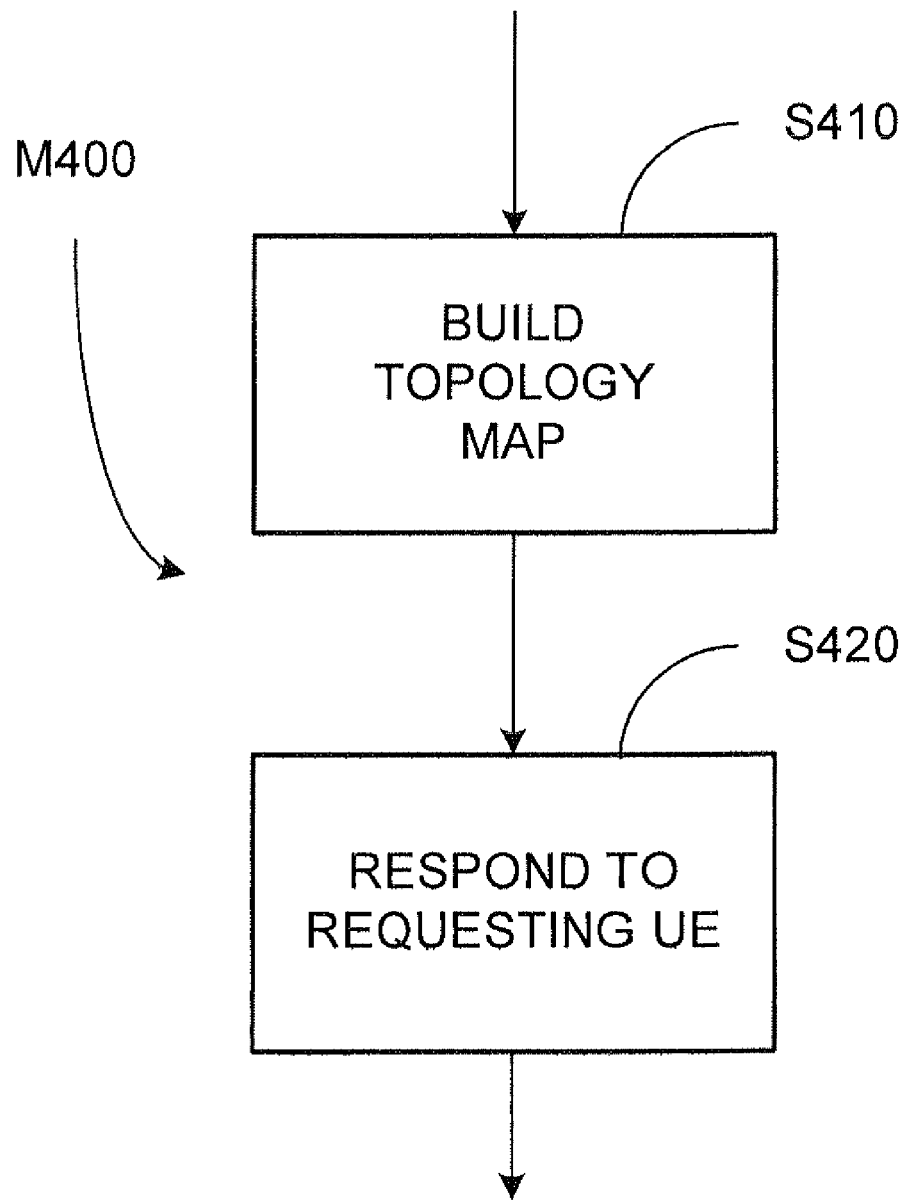
FIG. 4 illustrates a non-limiting example method to build the topology map and to respond to requests using the map.

FIG. 4 illustrates an example non-limiting method M400 that the IAN topology apparatus 110 performs, at least in part, to address the short comings of the existing manual provisioning of the topology information. Broadly, the apparatus 110 builds the topology map based on inter-access network (IAN) session transfers of the wireless terminals 120 in step S410. The IAN topology apparatus 110 also responds to requesting wireless terminals 120 for topology information in step S420. While not explicitly illustrated, the IAN topology apparatus 110 can perform each of these steps repeatedly to continually build the topology map and to continually respond to the requesting wireless terminals 120. Also, the steps need not be performed in the order specifically illustrated in FIG. 4.

Figure 5:
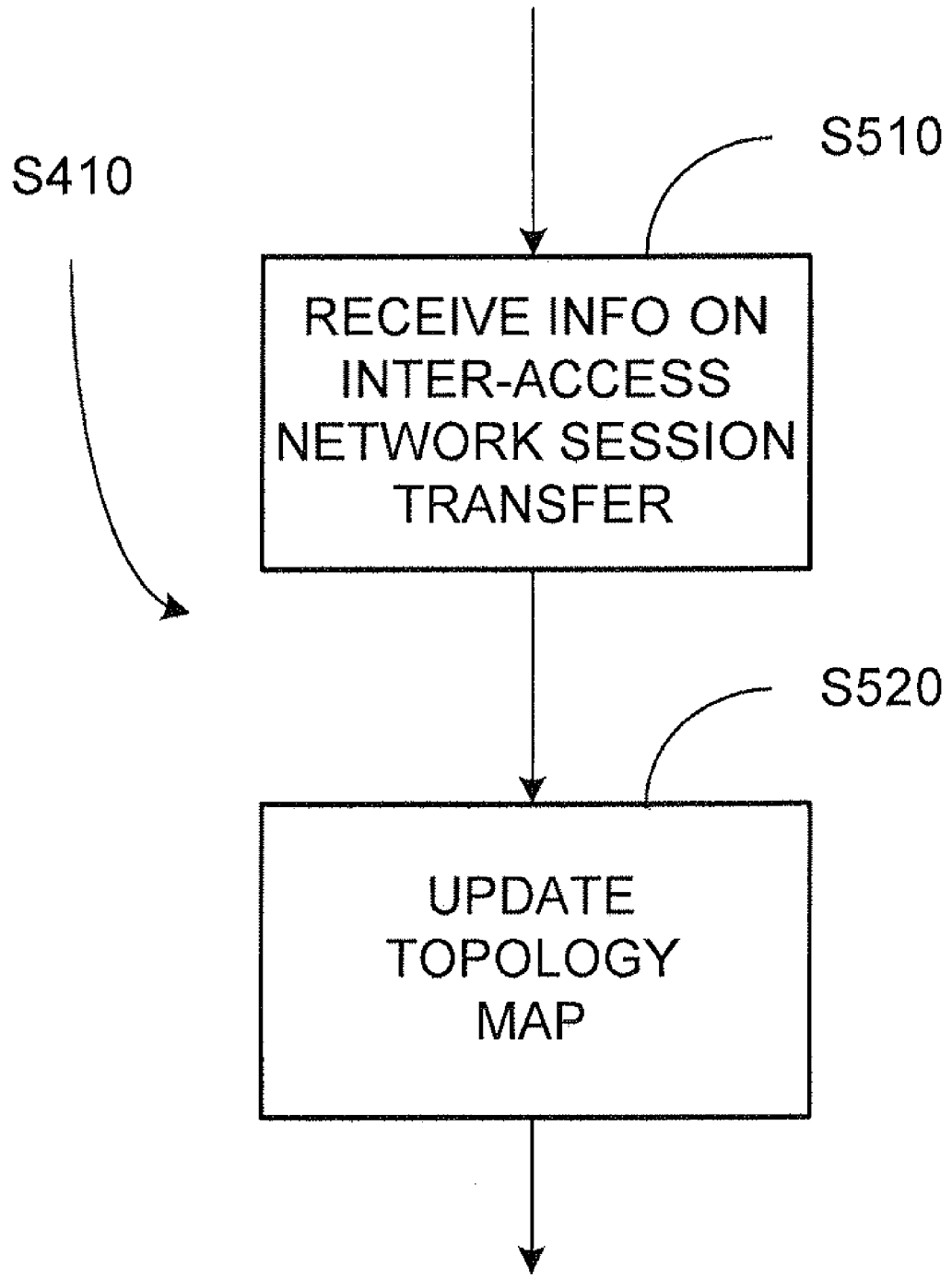
FIG. 5 illustrates a non-limiting example method to build the topology map based on IAN session transfers.

FIG. 5 illustrates an example non-limiting process to perform the step S410 of building the topology map. In step S510 of the process, the communication unit 320 receives an IAN session transfer information. An IAN session transfer occurs when a wireless terminal 120 transitions from accessing one access network to accessing a different access network. Since access to any access network is provided through a cell of that access network, the IAN session transfer may be viewed as a transition event in which the wireless terminal 120 transitions from accessing a first cell belonging to a first access network to accessing a second cell belonging to a second access network in which the first and second access networks are different from each other. The first and second cells can be referred to as source and target cells, respectively, of the transfer.

The communication unit 320 receives the IAN session transfer information through one of at least two mechanisms—network-based and wireless terminal-based. One characteristic of the network-based mechanism is that the IAN session transfer information, which originates from the wireless terminal 120 performing the transfer, propagates through messages passed (referred to as the "IAN procedure messages") among the nodes involved in the transfer, and is eventually provided to the apparatus 110 by one of the involved nodes in the communication path between the wireless terminal 120 and the apparatus 110.

For some access networks, there may be defined processes that already exist to perform an IAN session transfer such as a handover from one access network to another. For these existing defined processes, one advantage of the network-based mechanism is that no new procedures are required to implement the mechanism. Instead, one or more existing IAN procedure messages already passed among the involved nodes to coordinate the transfer can be augmented to include the IAN session transfer information. Such augmentations in most cases are relatively simple to implement. The specific functions performed by the involved nodes such as authentication, bearer creation, and so on need not be altered and simply pass the IAN session transfer information. Any node already configured to exchange messages with the IAN topology apparatus 110 can be used to provide the IAN session transfer information.

An example of an existing process is described in the 3GPP's document TS 23.402, section 8.2.1.1. This section describes a process to perform a handover of a UE, i.e., a wireless terminal, from a non-3GPP IP access to a 3GPP IP access on the S2a/S2b interfaces. The section also describes the procedures performed by the nodes involved in the handover and the messages exchanged between the nodes.

Figure 6A:
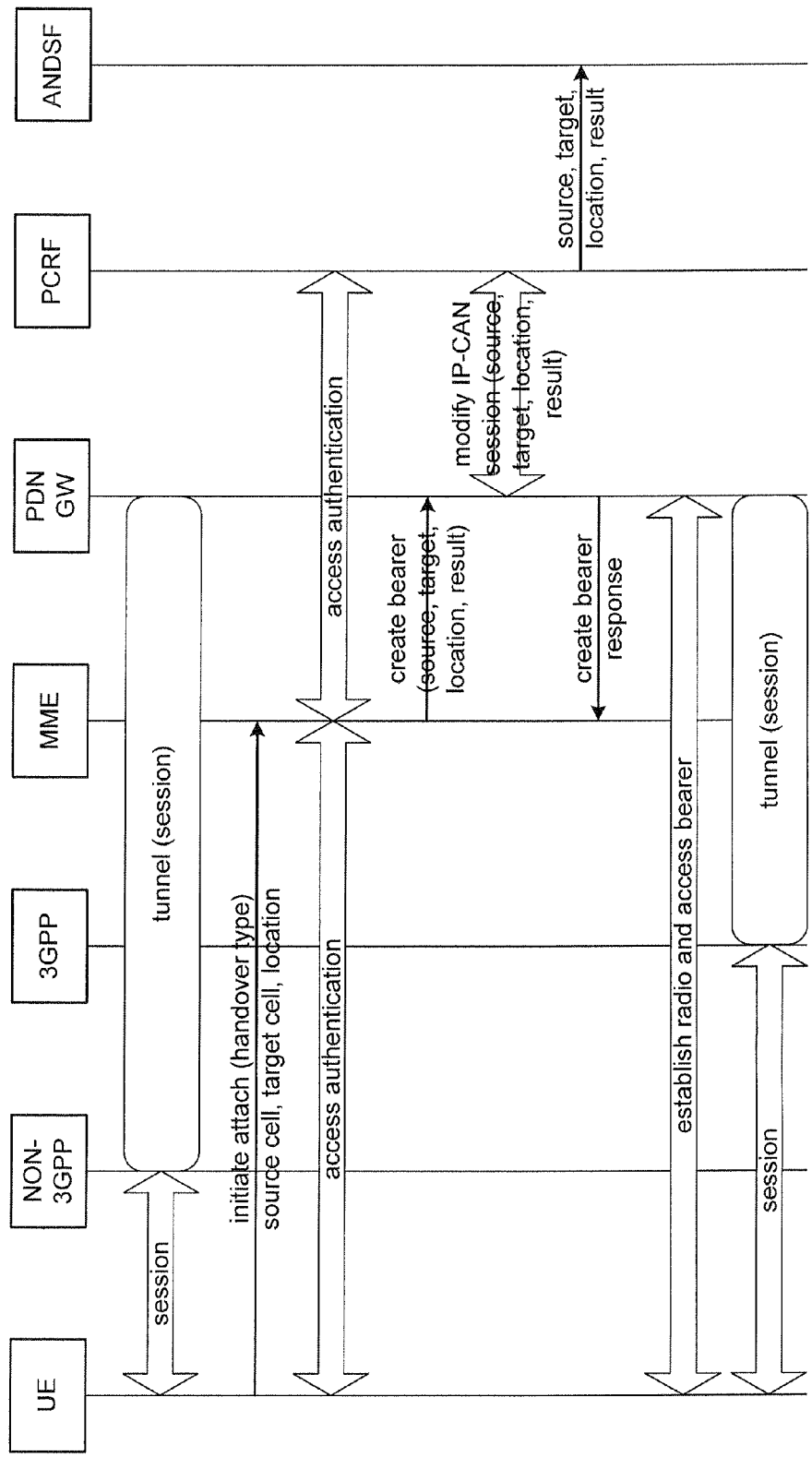
FIG. 6A illustrates a non-limiting example of a simplified view of a network-based mechanism of providing the IAN topology apparatus with the IAN session transfer information.

FIG. 6A illustrates a non-limiting example of a network-based modification to the existing 3GPP handover process. In the figure, a time line is shown of the messages exchanged between the various nodes to enable the handover from a non-3GPP cell to a 3GPP cell. The involved nodes include non-3GPP access network nodes, 3GPP access network nodes, and the core network nodes. FIG. 6A is a simplified view in that not all nodes involved in the process are illustrated. The view does include example augmentations that can be made to some of the existing messages passed between the involved nodes so that the IAN topology apparatus 110, e.g., the ANDSF, receives the handover information.

In FIG. 6A, the following existing messages are augmented—the "attach message" from the UE to the mobility management entity (MME), the "create bearer" message from the MME to the packet data network gateway (PDN GW), the "modify IP-CAN session" messages between the PDN GW and the policy and charging control (PCRF), and the message from the PCRF to the ANDSF.

In this particular example, the ANDSF receives the IAN session transfer information from the PCRF. In general, any node involved in the transfer—from the first access network, second access network, and the core network—can provide the information to the IAN topology apparatus 110.

Also, in addition to the messages identified in FIG. 6A, there are other messages that can be modified. In general, messages exchanged between any involved nodes in the communication path between the wireless terminal 120 and the IAN topology apparatus 110 are candidates for augmentation.

The messages can be augmented to include information on the source cell (non-3GPP cell in FIG. 6A), the target cell (3GPP cell), and a result (handover success/failure). Also the location of the wireless terminal 120 can be included. As will be demonstrated below, other information can be included in the message.

In contrast to the network-based mechanism, the wireless terminal-based mechanism simply includes a communication procedure allowing the wireless terminal 120 to directly provide the IAN session transfer information to the IAN topology apparatus 110. For an existing process which already allows such direct communication, this may include augmenting the message exchanged between the wireless terminal 120 and the apparatus 110.

If the existing process does not include this communication functionality, then a new communication procedure can be added. Even for existing processes, a benefit of the wireless terminal-based mechanism is that the existing procedures performed by the involved nodes as well as the content of the existing messages need not be modified. The mechanism simply requires an additional communication procedure between the wireless terminal 120 and the apparatus 110. If the existing process involves many nodes and complicated message passing, the wireless terminal-based mechanism could be preferable.

Figure 6B:
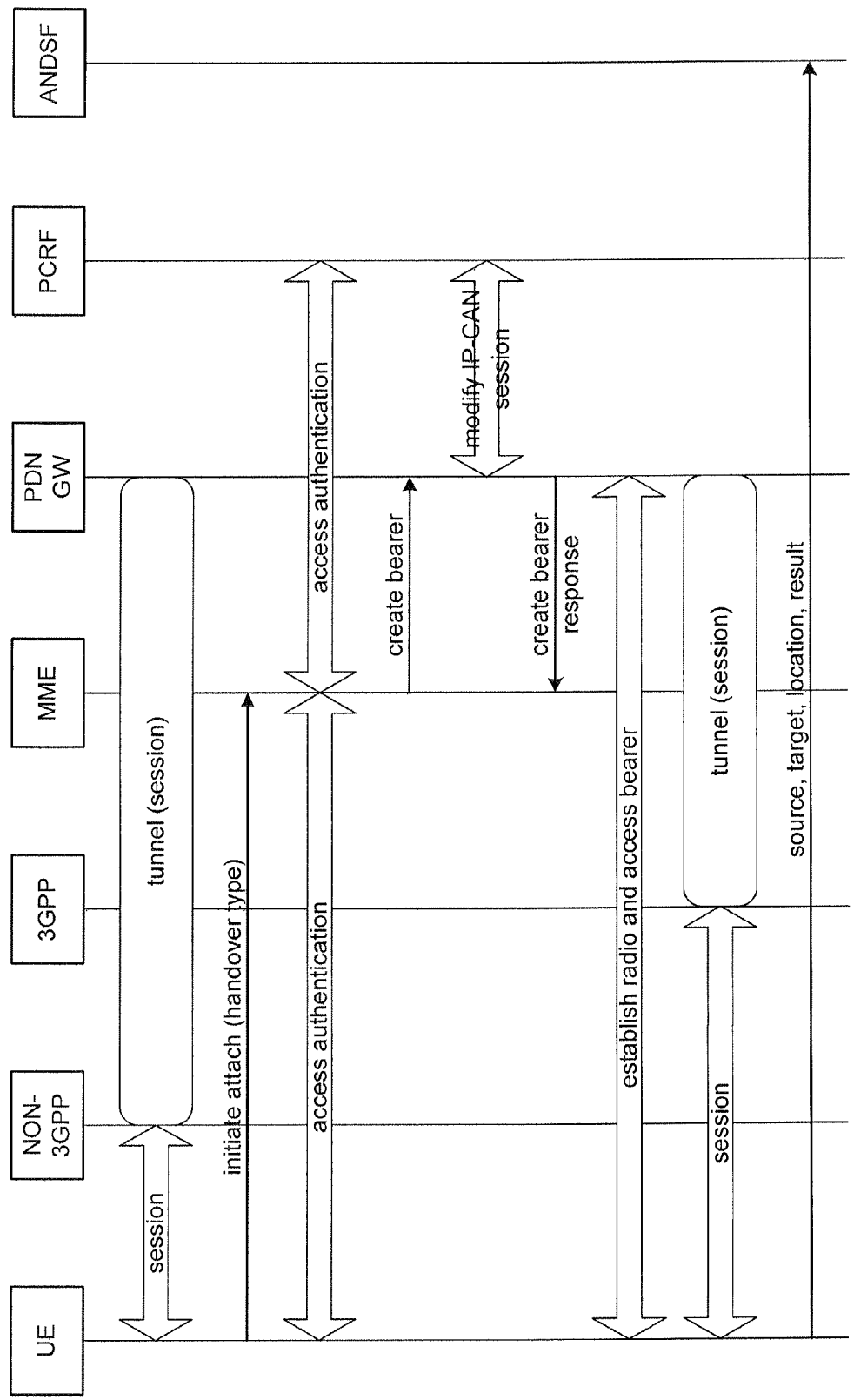
FIG. 6B illustrates a non-limiting example of a simplified view of a wireless terminal-based mechanism of providing the IAN topology apparatus with the IAN session transfer information.

FIG. 6B is provided as a non-limiting example of the wireless terminal-based mechanism. Like FIG. 6A, FIG. 6B illustrates a simplified view of the 3GPP handover process from the non-3GPP cell to a 3GPP cell. But unlike FIG. 6A, none of the existing procedures and messages is modified. Instead, a communication procedure is added at the end to send a message from the user equipment directly to the ANDSF with the pertinent information.

The message is direct in that there is a defined interface for communication between the wireless terminal 120 and the IAN topology apparatus 110. For example, in 3GPP, the UEs can communicate with the ANDSF through the S14 interface as illustrated in FIG. 1.

Figure 6C:
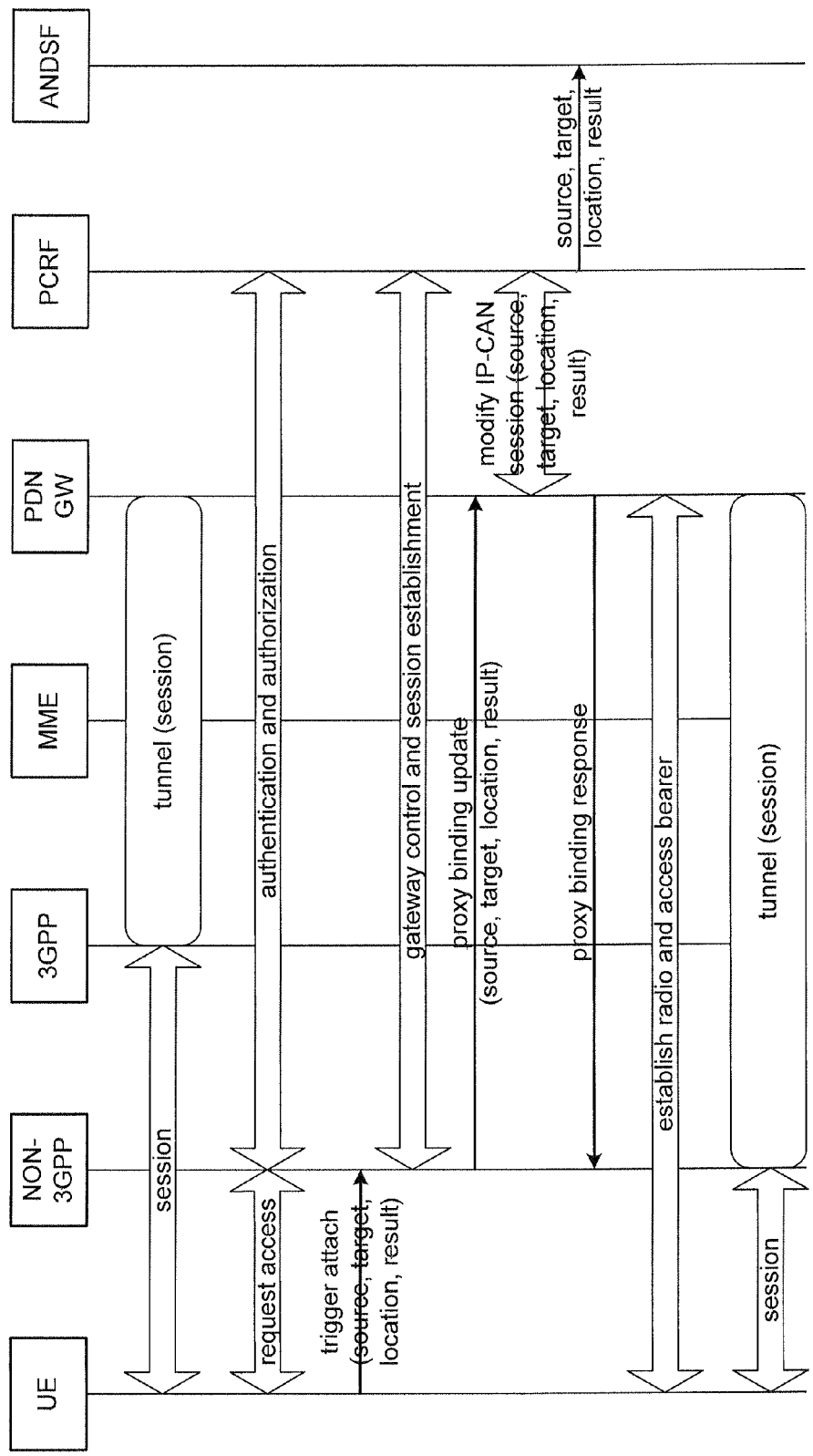
FIG. 6C illustrates another non-limiting example of a simplified view of the network-based mechanism of providing the IAN topology apparatus with the IAN session transfer information.
Figure 6D:
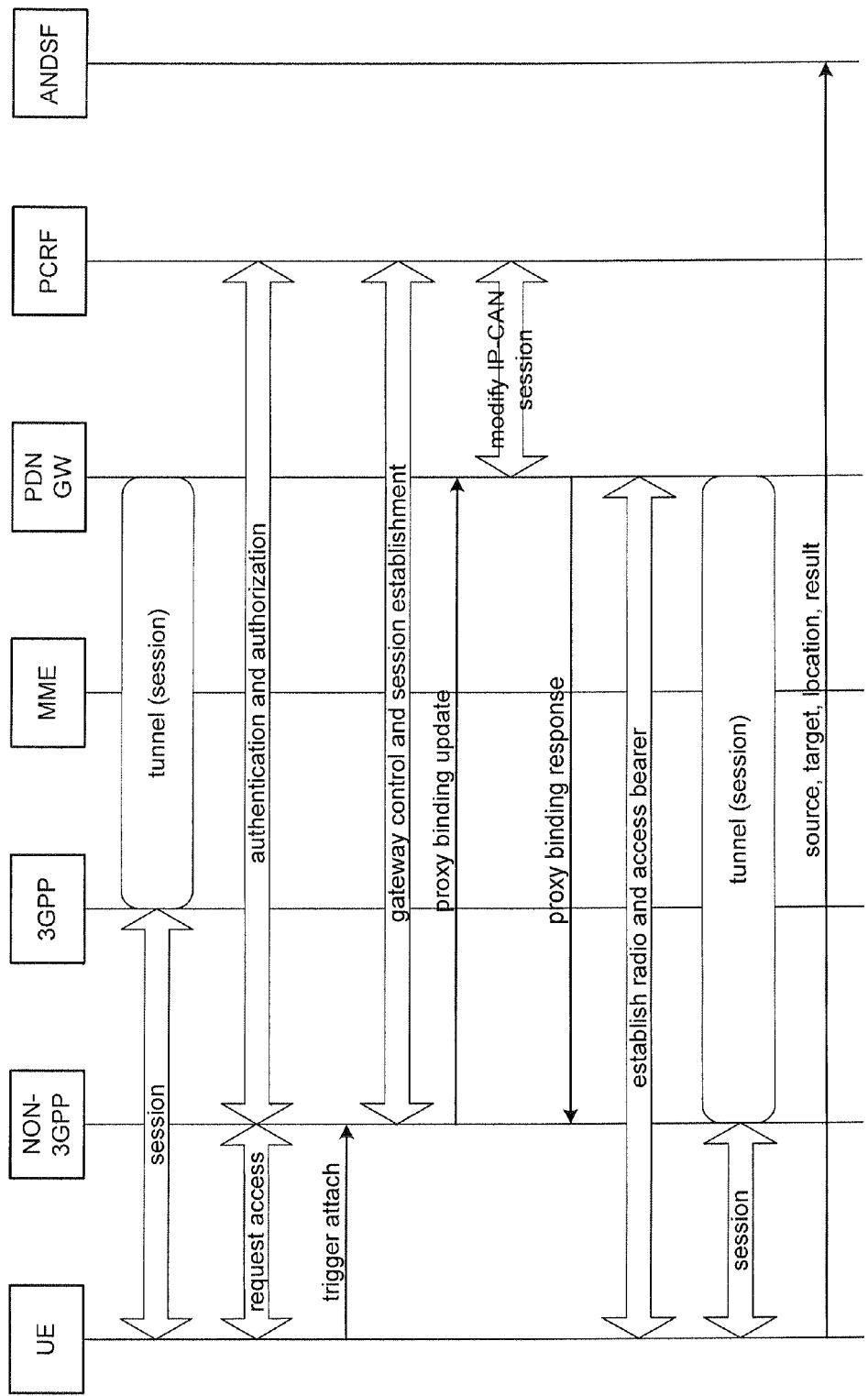
FIG. 6D illustrates another non-limiting example of a simplified view of the wireless terminal-based mechanism of providing the IAN topology apparatus with the IAN session transfer information.

FIGS. 6C and 6D also provide non-limiting examples of simplified views of the network-based and wireless terminal-based modifications to the existing 3GPP handover procedures. FIGS. 6C and 6D illustrate handovers in the other direction—from the 3GPP cell to the non-3GPP cell. In FIG. 6C, the messages are modified. In FIG. 6D, the UE directly notifies the ANDSF.

Referring back to FIG. 5, based on the IAN session transfer information received in step S510 by the communication unit 320, the processing unit 310 updates the topology map in step S520. In one non-limiting aspect, the topology map is stored in the storage unit 330 and the information therein is accessible to the other units of the IAN topology apparatus 110. The topology map includes one or more entries each providing a mapping information among neighboring cells of different access networks. In one non-limiting example embodiment, at least one entry provides information related to an access transfer from a source cell belonging to a source access network to a target cell belonging to a target access network in which the source and target networks are different.

Note that there are very little restrictions on the topology map. Since the topology map will be used to make IAN session transfer decisions, the map preferably includes entries in which the source and target cells of the entries belong to different access networks. Entries in which the source and target cells belong to the same access network are not prohibited, but it is assumed that handovers between cells of the same access network are already known and practiced, and thus, are not further discussed.

Also, because access networks of different operator networks are always considered to be different, the topology map can include entries in which the source and target cells belong to different operator networks all together. However, since the IAN topology apparatus 110 is assumed to be maintained in a core network which in turn is part of a single operator network, the topology map will most likely include entries in which one or both of the source and target cells belong to the access networks of the current operator. The operator network operating the core network (and thus operating the IAN topology apparatus 110) can be referred to as the "home operator network."

Also, the term "home access network" is introduced. In 3GPP, there are defined procedures in place to enable a wireless terminal 120 to access the ANDSF through the 3GPP access network. In this instance, the 3GPP would be the home access network. This simply recognizes that not all access networks may have processes in place to allow the wireless terminals 120 to access the IAN topology apparatus 110. Further, if access to the topology map is provided through a particular access network, a majority of the entries are likely to have either the source or the target cell belonging to that access network, but this is not a requirement.

In one non-limiting example embodiment, each entry of the topology map providing the mapping information includes source cell parameters and target cell parameters. The cell parameters can include: a cell technology parameter (GSM, LTE, E-UTRAN, WiFi, WiMax, CDMA2000, etc.), a cell identity parameter (CGI, AP name, Sector ID, Cell ID, Base Station ID, etc.), and a network identity parameter (MCC+MNC, SSID, etc.). The cell technology parameter indicates the cell's access technology, the cell identity parameter identifies the cell, and the network identity parameter identifies the associated access network.

While the cell identity parameter can uniquely identify the cell, this is not strictly necessary. In some networks, a cell (that is, the eNodeB/base station/access point/etc. associated with the cell) can broadcast a local cell ID in addition to a global cell ID. The wireless terminals 120 can scan and identify the local cell ID. While the local cell ID is not guaranteed to be unique throughout the network, it is typically shorter than the global cell ID, and a shorter ID broadcast enables faster identification during a scan, which in turn can provide faster performance.

Each entry can also include a transfer indicator parameter. This parameter can be used to indicate a result of a previous IAN session transfer that resulted in the entry being recorded such as "success" or "failure". The parameter can also be used to indicate a probability or likelihood of a successful transition from the source to the target cell. This can be expressed numerically (e.g., 60%, 0.7, etc.) or can be expressed as a hierarchy of levels (e.g., "very unlikely", "unlikely", "somewhat likely", "very likely", and so on).

An entry can also include a location parameter, which is optionally filled. This parameter, when filled, indicates a location of a previous wireless terminal 120 of the previous IAN session transfer that resulted in the entry being recorded. The location parameter can indicate a specific place such as GPS coordinates, an address, a building name, etc.

The parameter can also indicate an area. For example, a wireless terminal 120 may detect two or more cells, in which case, the location parameter would indicate an overlap of the communication ranges of the detected cells. A communication modulation scheme can also be used to indicate an area. In 3GPP, an eNodeB selects one of several modulation schemes (QPSK, 16QAM, 64QAM, and so on) to communicate with each wireless terminal 120. More robust schemes (allows for better error correction) are used for wireless terminals 120 relatively far from the eNodeB. Conversely, less robust schemes (faster data throughput) are used for wireless terminals 120 that are relatively near. Other location indications include a transmission power setting of the wireless terminal 120 (high setting for far, low setting for near) and a reported channel quality (e.g., CQI value) of the source/target cells (quality generally decreases in relation to the distance from the radio equipment).

A non-limiting example topology map is illustrated in FIG. 7. In this map, the first entry indicates that a previous IAN session transfer of a wireless terminal 120 from the source cell (with parameter values "3GPP", "cell 1", "LTE 1") to the target cell ("WiMAX", "BS 1", "WM 1") was successful and that the previous wireless terminal 120 was in area A. Note that not all entries have the location parameter filled.

When the processing unit 310 updates the topology map in step S520, either a new entry is created or an existing entry is modified. The processing unit 310 creates a new entry if there is no existing entry in which the source and target cell respectively match the first and second cells of the IAN session transfer. Otherwise, the processing unit 310 modifies the matching existing entry.

The IAN session transfer information includes first cell parameters, second parameters, and a transfer result parameter. The transfer result parameter indicates whether the wireless terminal 120 has successfully transitioned from the first to the second cell, i.e, whether the IAN session transfer was successful.

The processing unit 310 updates a topology map entry by updating (creating or modifying) the source cell parameters, the target cell parameters, and the transfer indicator parameter of the entry correspondingly based on the first cell parameters, the second cell parameters, and the transfer result parameter included in the IAN session transfer information.

In one non-limiting example embodiment, the parameters in the IAN session transfer information are simply copied including copying the transfer result parameter to the transfer indicator parameter (e.g., success/failure, yes/no, etc.). In another non-limiting example embodiment, the transfer indicator parameter of the entry is modified based on the transfer result parameter such as modifying the parameter from "likely" to "very likely" if the transition was successful.

If the IAN session transfer information includes a location of the wireless terminal, the location parameter of the entry is correspondingly updated. As noted previously, the location can be a specific place or an area.

Referring back to FIG. 4, the IAN topology apparatus 110 builds the topology map in step S410. The apparatus 110 also responds to a requesting wireless terminal 120 in step S420 by providing a scan cell list, which is a list of cells (zero or more) in the vicinity of the requesting wireless terminal 120. How the list is populated is further described below.

Figure 8:
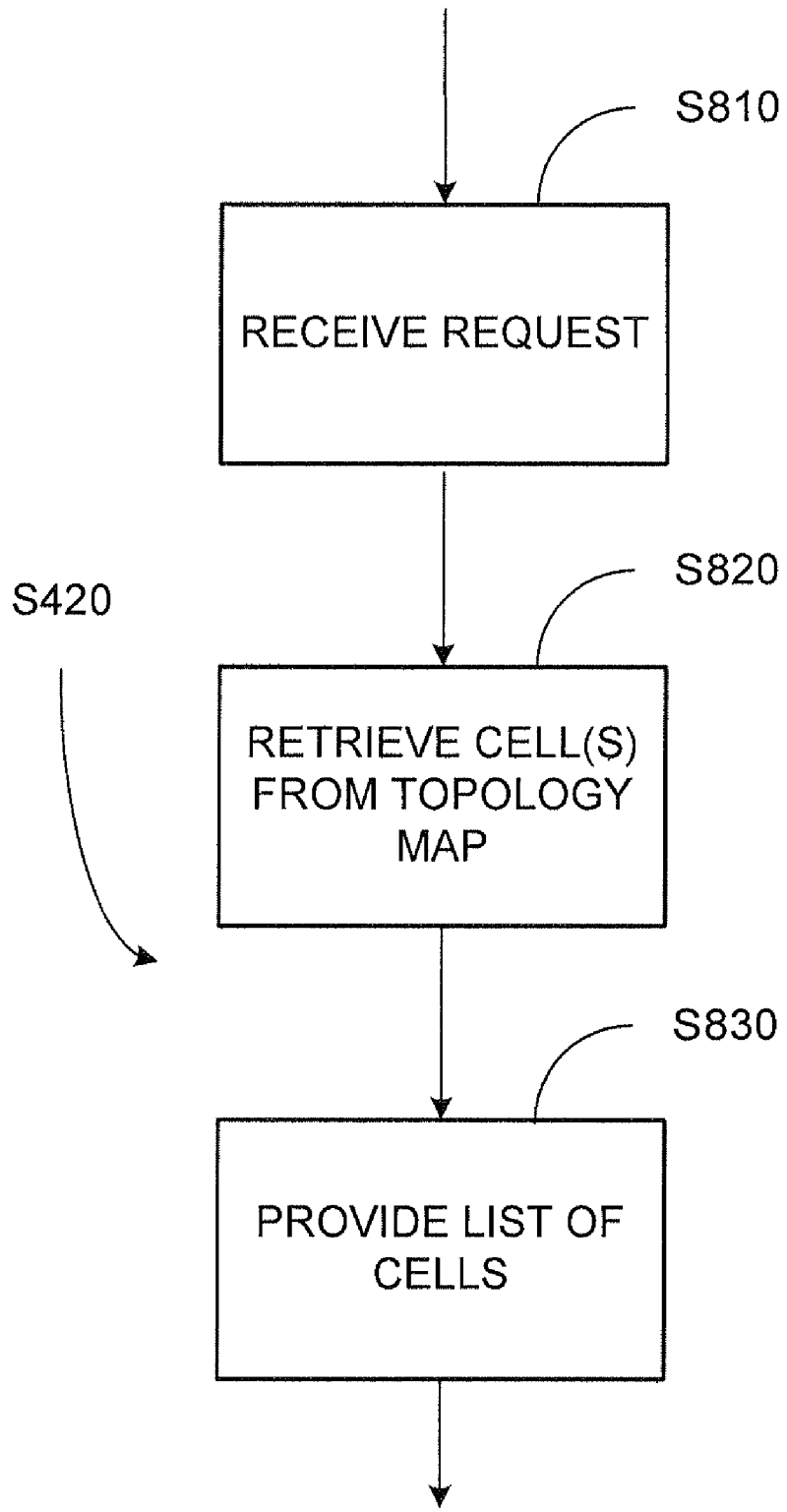
FIG. 8 illustrates a non-limiting example method to respond to a request from a requesting wireless terminal.

FIG. 8 illustrates a non-limiting example process to perform the step S420. In step S810 of the process, the communication unit 320 receives a request from the requesting wireless terminal 120. In step S820, the processing unit 310 retrieves target cells from the topology map by applying a selection criteria and adding all target cells that meet the selection criteria to the scan cell list. Then in step S830, the communication unit 320 provides the scan cell list to the requesting wireless terminal 120. This allows the requesting wireless terminal 120 to smartly select the cells to scan and thereby conserve resources.

In one non-limiting aspect, the selection criteria applied by the processing unit 310 is a combination of one or more selection conditions. The cells of the map entries that meet all conditions of the criteria are added. One condition is that only cells in the vicinity of the requesting wireless terminal 120 should be retrieved. The request received by the communication unit 320 includes information of a cell currently being accessed (current cell) by the requesting wireless terminal 120. The processing unit 310 retrieves all target cells of entries whose source cell matches the current cell. This condition can be stated as "the source cell parameters of the entry match the current cell parameters" (first condition).

Another condition may be applied to reflect the policies of the operator network that prevents the requesting wireless terminal 120 from accessing another access network. As an example, a subscriber of the requesting wireless terminal 120 may have subscribed for access only to the 3GPP and the WiFi and opted out of connection privileges to the WiMAX in return for a lower subscription price. The operator network enforcing the service agreement policy would prevent the requesting wireless terminal 120 from accessing WiMAX cells. Under this circumstance, the WiMAX cells, even when they are in the vicinity of the requesting wireless terminal 120, need not be added to the scan cell list. This condition can be stated as "operator policies of the operator network allow an IAN session transfer of the requesting wireless terminal to the target cell of the entry" (second condition).

In some instances, conserving battery power may be very important. In these instances, the scan cell list should include only those cells to which a successful transition is likely for the requesting wireless terminal 120. This condition can be stated as "transfer indicator parameter is at or above a threshold likelihood of successful IAN session transfer to the target cell of the entry" (third condition). The threshold likelihood may be expressed in absolutes (e.g., success/failure, yes/no, etc.), as a probability (e.g. 60%, 0.75, etc.) as a hierarchy of probability levels (e.g., very unlikely, somewhat likely, unlikely, etc.), and so on.

Sometimes, even when the transfer indicator parameter of an entry indicates that the IAN session transfer is unlikely to succeed, the target cell may still be added to the list if the requesting wireless terminal 120 is physically close to the target cell. This simply recognizes that connections are affected by the environment and closer wireless terminals 120 will experience better signal-to-noise ratios. Thus, if the request includes the location of the requesting wireless terminal 120, then the processing unit 310 can add the target cell to the list if the requesting wireless terminal 120 is close enough to the target cell or if it is closer to the target cell than indicated by the location parameter of the entry. This condition may be expressed as "the location of the requesting wireless terminal is within a first threshold distance from the target cell of the entry or is closer to the target cell of the entry by at least a second threshold distance than the location parameter of the entry" (fourth condition).

The selection criteria can include any combination of selection conditions including the first through fourth conditions. For practical reasons, the first condition should always be applied since this is the condition that selects the cells in the vicinity of the requesting wireless terminal 120. In most instances, first and second conditions are likely be applied since there is no need to add cells in which the operator policy will prevent access. The third and fourth conditions are adjustable in that depending on the settings of the thresholds, some cells will be included and other cells will not. This is not an exhaustive list of conditions.

Recall that in the method M400 illustrated FIG. 4, the IAN topology apparatus 110 builds the topology map based on information of the IAN session transfer performed by the wireless terminal 120. Also recall the IAN session transfer information, originating from the wireless terminal 120, is provided to the IAN topology apparatus 110 through either the network- or the wireless terminal-based mechanisms.

Figure 9:
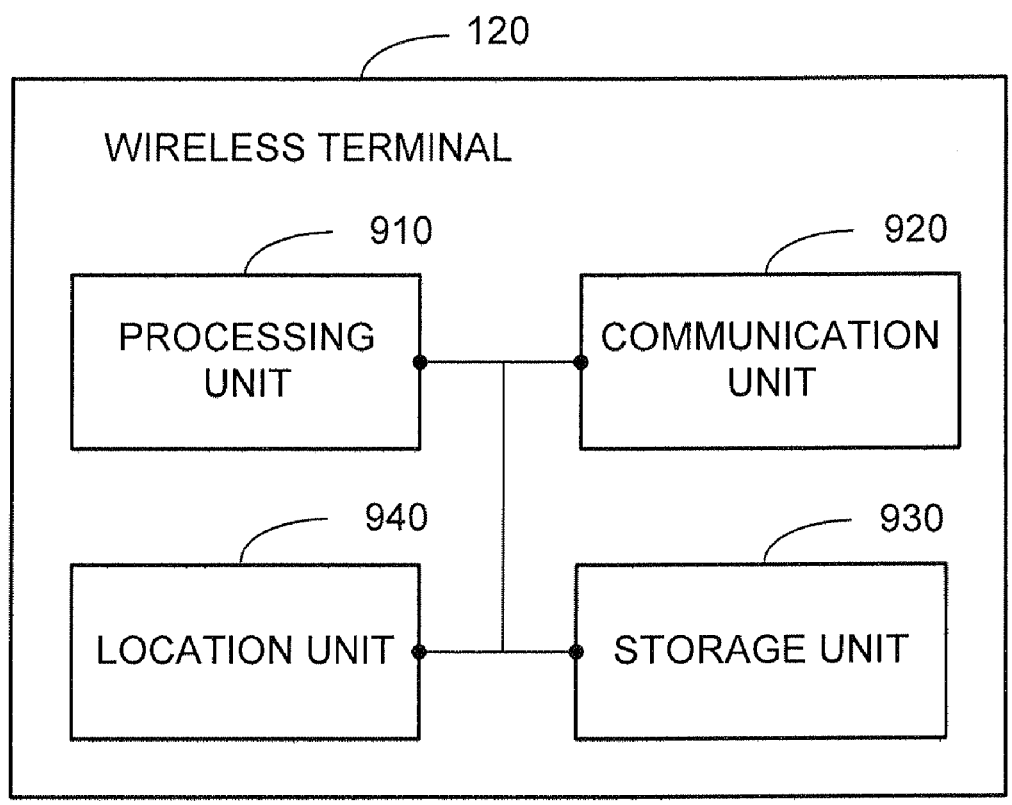
FIG. 9 illustrates a non-limiting example embodiment of a wireless terminal.

FIG. 9 illustrates a non-limiting example embodiment of a wireless terminal 120 which can perform an IAN session transfer and inform the IAN topology apparatus 110. The wireless terminal 120 includes, among others, a processing unit 910, a communication unit 920, and a storage unit 930. The wireless terminal may also include a location unit 940. The processing unit 910 is arranged to control the other units of the apparatus to provide services associated with the wireless terminal 120. The communication unit 920 is arranged to communicate with cells of at least two different access networks. In addition, through defined logical interfaces, the communication unit 920 may also directly communicate with nodes involved in the IAN session transfer including the IAN topology apparatus 110. The storage unit 930 is arranged to store information necessary for the operation of the wireless terminal 120.

Figure 10:
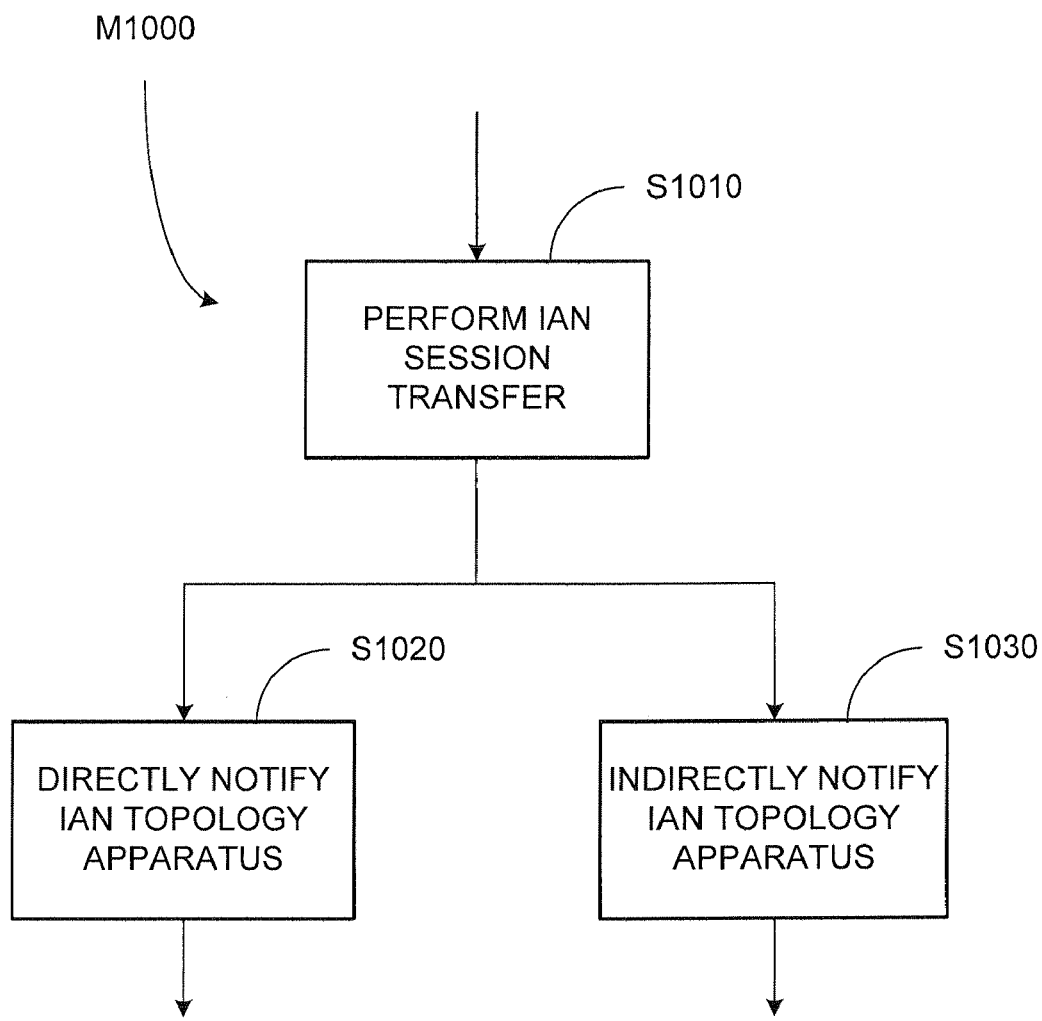
FIG. 10 illustrates a non-limiting example method to provide the IAN session transfer information to the IAN topology apparatus.

FIG. 10 illustrates a non-limiting example method M1000 that the wireless terminal 120 performs to inform the IAN topology apparatus 110. Broadly, the processing unit 910, through the communication unit 920, performs the IAN session transfer in step S1010. The communication unit 920 notifies the IAN topology apparatus 110 of the IAN session transfer either directly in step S1020 or indirectly in step S1030. When directly notifying, the communication unit 920 sends a message with the relevant information through the defined interface, such as the S14 interface, to the IAN topology apparatus 110. When indirectly notifying, the communication unit 920 sends the message to one of the intermediate nodes involved in the IAN session transfer, such as the MME.

In both steps S1020 and S1030, the processing unit 910 forms the content of the message that includes parameters of the first cell and the second cell of the IAN session transfer. The message can include a transfer result indicating whether the transfer is successful or not. If the wireless terminal 120 includes the location unit 940, the processing unit 940 can also include the location information in the message. The location can either be a specific place or an area.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby. Furthermore, no element, component, or method act in the present disclosure is intended to be dedicated to the public.

What is claimed is:

1. A method to operate an inter-network access (IAN) topology apparatus, comprising:
   automatically building a topology map based on an IAN session transfer of a wireless terminal,
   wherein the IAN session transfer occurs when the wireless terminal transitions from accessing a first cell belonging to a first access network to accessing a second cell belonging to a second access network,
   wherein the first and second access networks are different access networks,
   wherein the topology map includes one or more entries, each entry providing mapping information related to a transition from a source cell belonging to a source network to a target cell belonging to a target network, the source and target access networks being different access networks,
   wherein at least one entry of the topology map includes source cell parameters, target cell parameters, and a transfer indicator parameter,
   wherein each of the source and the target cell parameters of each topology map entry include a cell technology parameter, a cell identifier parameter, and an access network identity parameter, and
   wherein the step of building the topology map comprises:
      receiving IAN session transfer information of the wireless terminal, the IAN session transfer information including first cell parameters, second cell parameters, and a transfer result parameter; and
      updating the topology map such that source cell parameters, target cell parameters, and the transfer indicator parameter of the entry are correspondingly updated based on the first cell parameters, the second cell parameters, and the transfer result parameter.

2. The method of claim 1,
   wherein the IAN topology apparatus is a part of a core network, and
   wherein the core network is part of an operator network operated by an operator, the operator network further including one or more access networks.

3. The method of claim 2, wherein the topology map includes at least one entry in which at least one of the source and target cells does not belong to the operator network.

4. The method of claim 1,
   wherein at least one entry of the topology map includes an optional location parameter which, when filled, indicates a location of a previous wireless terminal of a previous IAN session transfer that resulted in the at least one entry being recorded, and
   wherein the step of building the topology map further comprises updating the location parameter of the entry when a wireless terminal location is received in the step of receiving the IAN session transfer information.

5. The method of claim 4, wherein the location parameter, when filled, indicates a specific place or an area.

6. The method of claim 5, wherein the location parameter is based on any one or more of coordinates, an address, a building name, an overlap of communication ranges of two or more cells, a communication modulation scheme, a transmission power setting of the previous wireless terminal, and a quality of a channel of the source and/or the target cell.

7. The method of claim 1, wherein in the step of receiving the IAN session transfer information, the information originates from the wireless terminal and is propagated through one or more IAN procedure messages before being received by the IAN topology apparatus.

8. The method of claim 7, wherein in the step of receiving the IAN session transfer information, the information is received from any one of one or more nodes of the first access network, of the second access network, and of the core network involved in the IAN session transfer.

9. The method of claim 8, wherein in the step of receiving the IAN session transfer information, the information is received from a policy and charging control (PCRF) element of the core network.

10. The method of claim 1, wherein in the step of receiving the IAN session transfer information, the information is directly received from the wireless terminal.

11. The method of claim 1, further comprising responding to a request from a requesting wireless terminal to provide a scan cell list to the requesting wireless terminal,
   wherein the step of responding to the request from the requesting wireless terminal comprises:
      receiving the request from the requesting wireless terminal;
      retrieving zero or more target cells from the topology map based on applying a selection criteria and adding the target cells that meet the selection criteria to the scan cell list, wherein the selection criteria is a combination of one or more selection conditions; and
      providing the scan list to the requesting wireless terminal.

12. The method of claim 11,
   wherein the request includes cell parameters of a current cell currently being accessed by the requesting wireless terminal,
   wherein the selection conditions include:
      a first condition of "source cell parameters of the entry match the current cell parameters",
      a second condition of "operator policies of the operator network allow an IAN session transfer of the requesting wireless terminal to the entry's target cell",
      a third condition of "transfer indicator parameter of the entry is at or above a threshold likelihood of successful IAN session transfer to the entry's target cell", and
   wherein the selection criteria includes at least the first condition.

13. The method of claim 12,
   wherein the request includes a location of the requesting wireless terminal, and
   wherein the selection conditions include a fourth condition of "the location of the requesting wireless terminal is within a first threshold distance from the target cell of the entry or is closer to the target cell of the entry by at least a second threshold distance than the location parameter of the entry."

14. The method of claim 12, wherein the selection criteria includes at least the second condition.

15. The method of claim 1,
wherein the IAN topology apparatus is an Access Network Discovery Selection Function (ANDSF) server of a 3GPP access network,
wherein at least one entry of the topology map has one of the source or the target cell belonging to the 3GPP access network, and
wherein the IAN session transfer includes a handover of the wireless terminal from the first cell to the second cell.

16. The method of claim 1, wherein in the step of receiving the IAN session transfer information, an IAN session transfer failure is received from the wireless terminal when the wireless terminal fails to access the second cell.

17. An inter-access network (IAN) topology apparatus, comprising:
a processing unit arranged to automatically build a topology map based on an IAN session transfer of a wireless terminal;
a storage unit arranged to store the topology map, each topology map entry including source cell parameters, target cell parameters, and a transfer result parameter; and
a communication unit arranged to receive IAN session transfer information of the wireless terminal, the IAN session transfer information including first cell parameters, second cell parameters, and a transfer result parameter,
wherein the IAN session transfer occurs when the wireless terminal transitions from accessing a first cell belonging to a first access network to accessing a second cell belonging to a second access network,
wherein the first and second access networks are different access networks,
wherein the IAN topology apparatus is a part of a core network,
wherein the core network is part of an operator network operated by an operator, the operator network further including one or more access networks,
wherein the topology map includes one or more entries, each entry providing a mapping information related to a transition from a source cell belonging to a source network to a target cell belonging to a target network, the source and target access networks being different access networks,
wherein each of the source and the target cell parameters of each topology map entry include a cell technology parameter, a cell identifier parameter, and an access network identity parameter, and
wherein the processing unit is arranged to update the topology map in the storage unit based on the IAN session transfer information such that source cell parameters, target cell parameters, and the transfer indicator parameter of the entry are correspondingly updated based on the first cell parameters, the second cell parameters, and the transfer result parameter.

18. The IAN topology apparatus of claim 17, wherein the topology map includes at least one entry in which at least one of the source and target cells does not belong to the operator network.

19. The IAN topology apparatus of claim 18,
wherein the IAN topology apparatus is an Access Network Discovery Selection Function (ANDSF) server of a 3GPP access network,
wherein at least one entry of the topology map has one of the source or the target cell belonging to the 3GPP access network, and
wherein the IAN session transfer includes a handover of the wireless terminal from the first cell to the second cell.

20. The IAN topology apparatus of claim 17,
wherein at least one entry of the topology map includes an optionally fillable location parameter which, when filled, indicates a location of a previous wireless terminal of a previous IAN session transfer that resulted in the at least one entry being recorded,
wherein the location parameter, when filled, indicates a specific place or an area, and
wherein the processing unit is arranged to update the location parameter of the entry when a wireless terminal location is received by the communication unit as a part of receiving the IAN session transfer information.

21. The IAN topology apparatus of claim 17, wherein the IAN session transfer information originates from the wireless terminal and propagated through one or more IAN procedure messages exchanged among one or modes nodes of the first access network, of the second access network, and the core network involved in the IAN session transfer before being received by the communication unit.

22. The IAN topology apparatus of claim 17, wherein the communication unit is arranged to receive the IAN session transfer information directly from the wireless terminal.

23. The IAN topology apparatus of claim 17,
wherein the communication unit is arranged to receive a request from a requesting wireless terminal and to provide a scan cell list retrieved by the processing unit to the requesting wireless terminal,
wherein the processing unit is arranged to retrieve zero or more target cells from the topology map based on applying a selection criteria and adding the target cells that meet the selection criteria to the scan cell list, and
wherein the selection criteria is a combination of one or more selection conditions.

24. The IAN topology apparatus of claim 23,
wherein the request includes cell parameters of a current cell currently being accessed by the requesting wireless terminal,
wherein the selection conditions include:
a first condition of "source cell parameters of the entry match the current cell parameters",
a second condition of "operator policies of the operator network allow an IAN session transfer of the requesting wireless terminal to the entry's target cell",
a third condition of "transfer indicator parameter of the entry is at or above a threshold likelihood of successful IAN session transfer to the entry's target cell", and
wherein the selection criteria includes at least the first condition.

25. The IAN topology apparatus of claim 24,
wherein the request includes a location of the requesting wireless terminal, and wherein the selection conditions include a fourth condition of "the location of the requesting wireless terminal is within a first threshold distance from the target cell of the entry or is closer to the target cell of the entry by at least a second threshold distance than the location parameter of the entry."

26. The IAN topology apparatus of claim 24, wherein the selection criteria includes at least the second condition.

27. The IAN topology apparatus of claim 17, wherein the communication unit receives an IAN session transfer failure from the wireless terminal when the wireless terminal fails to access the second cell.

* * * * *

UNITED STATES PATENT AND TRADEMARK OFFICE
CERTIFICATE OF CORRECTION

PATENT NO. : 7,940,726 B2 Page 1 of 1
APPLICATION NO. : 12/368504
DATED : May 10, 2011
INVENTOR(S) : Olsson et al.

It is certified that error appears in the above-identified patent and that said Letters Patent is hereby corrected as shown below:

In Column 10, Line 24, before "Fig. 4", insert -- in --.

In Column 14, Line 28, in Claim 21, delete "modes" and insert -- more --, therefor.

Signed and Sealed this
Twentieth Day of September, 2011

David J. Kappos
*Director of the United States Patent and Trademark Office*